(12) United States Patent
Marzorati et al.

(10) Patent No.: US 11,750,597 B2
(45) Date of Patent: Sep. 5, 2023

(54) UNATTENDED AUTHENTICATION IN HTTP USING TIME-BASED ONE-TIME PASSWORDS

(71) Applicant: KYNDRYL, INC., New York, NY (US)

(72) Inventors: Mauro Marzorati, Lutz, FL (US); Seda Ozses, Vienna (AT); Barbara K. Smith, Derby, KS (US); Cindy J Mullen, Madison, WI (US)

(73) Assignee: Kyndryl, Inc., New York, NY (US)

( * ) Notice: Subject to any disclaimer, the term of this patent is extended or adjusted under 35 U.S.C. 154(b) by 68 days.

(21) Appl. No.: 17/351,557

(22) Filed: Jun. 18, 2021

(65) Prior Publication Data
US 2022/0407851 A1 Dec. 22, 2022

(51) Int. Cl.
*H04L 9/40* (2022.01)
*H04L 67/02* (2022.01)

(52) U.S. Cl.
CPC ........ *H04L 63/0838* (2013.01); *H04L 63/108* (2013.01); *H04L 63/20* (2013.01); *H04L 67/02* (2013.01)

(58) Field of Classification Search
CPC ... H04L 63/0838; H04L 63/108; H04L 63/20; H04L 67/02
USPC .......................................................... 726/4
See application file for complete search history.

(56) References Cited

U.S. PATENT DOCUMENTS

| | | | |
|---|---|---|---|
| 8,656,459 | B2 | 2/2014 | Mardikar |
| 10,911,485 | B2 | 2/2021 | Kitchen |
| 2004/0193921 | A1* | 9/2004 | Byrne ............... G06F 21/41 709/229 |
| 2017/0331801 | A1* | 11/2017 | Mezei ............... H04L 63/068 |
| 2018/0069837 | A1* | 3/2018 | Graham-Cumming ...... H04L 67/56 |
| 2018/0097806 | A1* | 4/2018 | Blinn ............... H04L 63/0861 |
| 2019/0098001 | A1* | 3/2019 | Yang ............... H04L 63/10 |
| 2019/0386981 | A1* | 12/2019 | Ramesh Kumar .... H04L 9/3228 |
| 2019/0386983 | A1* | 12/2019 | Ledesma ............. H04L 63/0838 |

(Continued)

FOREIGN PATENT DOCUMENTS

| | | |
|---|---|---|
| KR | 101624266 B1 | 4/2015 |
| WO | 2019017525 A1 | 1/2019 |

OTHER PUBLICATIONS

Lakshmiraghavan, Badrinarayanan. "Two-factor authentication." In Pro ASP. NET Web API Security, pp. 319-343. Apress, Berkeley, CA, 2013. (Year: 2013).*

(Continued)

*Primary Examiner* — Taylor A Elfervig
(74) *Attorney, Agent, or Firm* — Erik Swanson; Andrew M. Calderon; Calderon Safran & Cole, P.C.

(57) ABSTRACT

In an approach to unattended authentication in HTTP using time-based one-time passwords, a request is received from a client for a Hypertext Transfer Protocol (HTTP) authentication on a server. A challenge is sent to the client, where the challenge includes a header that indicates that a Time-based One-time Password (TOTP) is to be used for the HTTP authentication. A first response is received from the client based on a first TOTP value and a shared secret, wherein the first response is encoded based on an encoding mechanism included in the header. Responsive to validating the first TOTP value and the shared secret from the client, the client is authenticated.

14 Claims, 7 Drawing Sheets

(56) References Cited

U.S. PATENT DOCUMENTS

| | | | |
|---|---|---|---|
| 2020/0026397 A1* | 1/2020 | Wohlstadter | G06F 3/04845 |
| 2020/0074070 A1* | 3/2020 | Boodaei | G06F 21/33 |
| 2020/0084222 A1* | 3/2020 | William | H04L 9/3242 |
| 2020/0092284 A1* | 3/2020 | Zhu | H04L 63/1416 |
| 2020/0128002 A1* | 4/2020 | Khanna | H04L 9/3228 |
| 2020/0228311 A1* | 7/2020 | Capola | H04L 9/065 |
| 2020/0314086 A1 | 10/2020 | Zeck | |
| 2021/0019707 A1 | 1/2021 | Sathiamoorthy | |
| 2021/0288957 A1* | 9/2021 | Burch | H04L 63/0838 |
| 2022/0360448 A1* | 11/2022 | Sahni | H04L 9/3271 |

OTHER PUBLICATIONS

Krishna Shingala, "JSON Web Token (JWT) based client authentication in Message Queuing Telemetry Transport (MQTT)", ARXIV , Cornell Univ, p. 1-19, 2019, (Year: 2019).*

M. Buschsieweke and M. Güneş, "Authentication for the web of things: Secure end-to-end authentication between CoAP and HTTP," 2017 IEEE 28th Annual International Symposium on Personal, Indoor, and Mobile Radio Communications (PIMRC), Montreal, QC, Canada, 2017, pp. 1-5, (Year: 2017).*

Benito Peral A, Sandoval Orozco AL, García Villalba LJ, Kim TH. Distributed One Time Password Infrastructure for Linux Environments. Entropy (Basel). Apr. 26, 2018, p. 1-13 (Year: 2018).*

"Time-based One-Time Password", Wikipedia, The Free Encyclopedia, last updated on Mar. 10, 2021, downloaded from the Internet on May 11, 2021, 3 pgs., <https://en.wikipedia.org/wiki/Time-based_One-Time_Password>.

Almahmoud, et al., "Smart Authentication for Real-Time Business Process Monitoring," The 7th International Conference for Internet Technology and Secured Transactions (ICITST-2012), 2012, downloaded from the Internet on Apr. 17, 2021, 6 pgs., © 2012 IEEE.

Bousios, et al., "Univents: an eID IT System", Diploma Thesis—Univents, Jun. 29, 2016, 151 pgs., University of the Aegean, School Of Engineering, Depailment of Information & Communication Systems Engineering.

Gupta, "A Replay-Attack Resistant Message Authentication Scheme Using Time-Based Keying Hash Functions and Unique Message Identifiers", Feb. 5, 2016, 12 pgs., Department of Computer Science and Engineering, NIIT University, Neemrana, RJ, India, arXiv:1602.02148v1 [cs.CR].

Lee, "Strengthening of Token Authentication Using Time-based Randomization", Journal of Security Engineering, vol. 14, No. 2, Apr. 30, 2017, pp. 103-114, ISSN: 1738-7531.

Nance, et al., "An Integrated Two-Factor Authentication Solution Using Pulse Connect Secure and Apache HTTP Server", ORNL/TM-2020/1324, Oak Ridge National Laboratory (ORNL), Oak Ridge, TN, United States, Jan. 20, 2020, 16 pgs.

Oliynyk, "TOTP Algorithm Explained", Protectimus, Jun. 24, 2020, 7 pgs., <https://www.protectimus.com/blog/totp-algorithm-explained/>.

* cited by examiner

UNATTENDED AUTHENTICATION IN HTTP USING TIME-BASED ONE-TIME PASSWORDS

BACKGROUND

The present invention relates generally to the field of cryptographic mechanisms for secure communication, and more particularly to unattended authentication in Hypertext Transfer Protocol (HTTP) using time-based one-time passwords.

HTTP basic authentication is a simple challenge and response mechanism with which a server can request authentication information (a user ID and password) from a client. The client passes the authentication information to the server in an authorization header. The authentication information is typically in base-64 encoding.

A one-time password (OTP) is a password that is valid for only one login session or transaction, on a computer system or other digital device. OTPs avoid several shortcomings that are associated with traditional (static) password-based authentication.

Time-based One-time Password (TOTP) is a computer algorithm that generates a one-time password (OTP) which uses the current time as a source of uniqueness. An extension of the HMAC-based One-time Password algorithm (HOTP), it has been adopted as Internet Engineering Task Force (IETF) standard RFC 6238.

SUMMARY

Embodiments of the present invention disclose a method, a computer program product, and a system for unattended authentication in HTTP using time-based one-time passwords. In one embodiment, a request is received from a client for a Hypertext Transfer Protocol (HTTP) authentication on a server. A challenge is sent to the client, where the challenge includes a header that indicates that a Time-based One-time Password (TOTP) is to be used for the HTTP authentication. A first response is received from the client based on a first TOTP value and a shared secret, wherein the first response is encoded based on an encoding mechanism included in the header. Responsive to validating the first TOTP value and the shared secret from the client, the client is authenticated.

DETAILED DESCRIPTION

Figure 1:
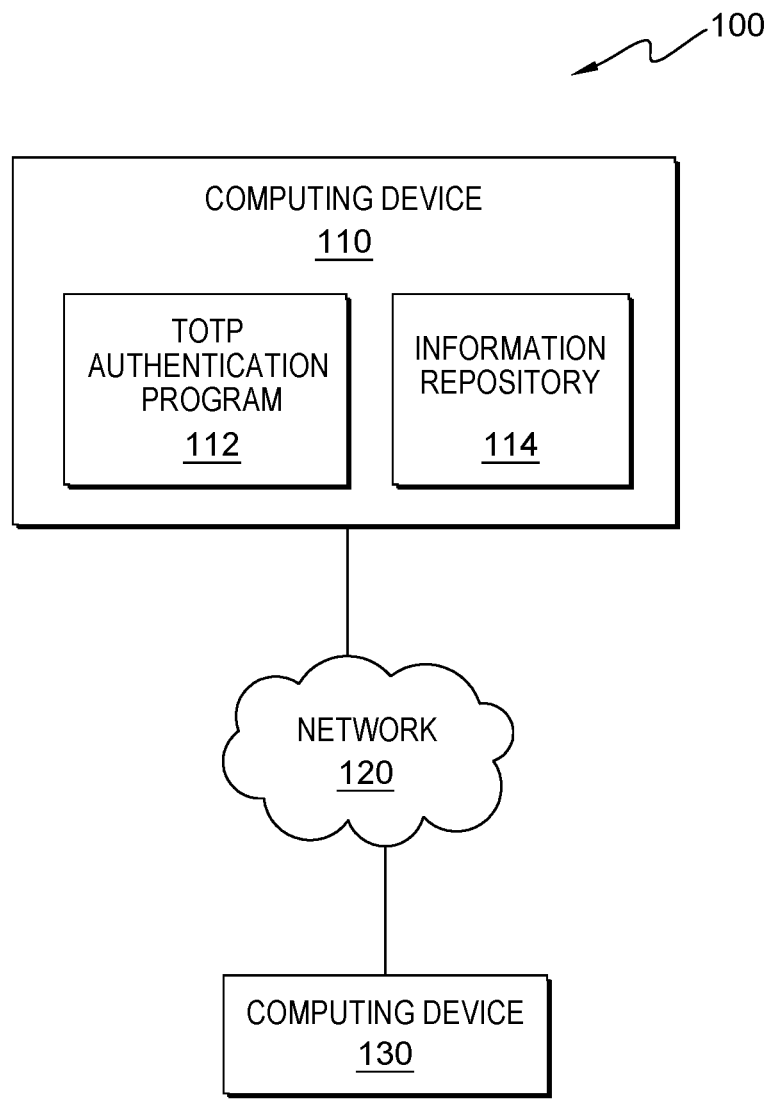
FIG. 1 is a functional block diagram illustrating a distributed data processing environment, in accordance with an embodiment of the present invention.

Machines today are talking to each other all the time, banding together to form a solution, such as the e-business three-tier architecture, but also containerized microservices deployed in the cloud. HTTP is the de-facto transport protocol for these communications. Currently Transport Layer Security (TLS) can provide external rigidity that is useful against eavesdropping, and when paired with a client certificate can provide a two-way authentication mechanism. But client authentication with client-side certificates is burdensome and thus not very prevalent. HTTP does provide an authorization header in the protocol for exchanging basic userid/password authorization strings as described in RFC7617.

WebSocket is another protocol that enables two-way communication between a client and a remote host. As discussed in RFC6455, the goal of this protocol is to allow two-way communication without relying on opening multiple HTTP sessions. Some examples of where WebSocket is used in practice include messaging platforms and real-time feeds. The WebSocket protocol does not prescribe a specific authentication mechanism, but rather uses the authentication method provided by an HTTP server, including basic authentication and TLS. The security model is based on the model provided in most web browsers. This becomes problematic when used by a client directly rather than through a browser, such as the case with machine-to-machine communication for automation since, as passwords become stale, security is reduced.

To improve security, passwords should be made disposable through the method described in RFC6238 for time-based one-time passwords, TOTP. The problem that remains is that these two methods remain unconnected, i.e., there is no mechanism for using TOTP-based authentication in the transport layer. The present invention solves this problem. The utility of the present invention is in having a secure standards-based approach to exchanging short-lived authorization tokens between independent operators.

At the highest level the present invention is a plug-in substitute authentication mechanism in an HTTP transaction. Whereas the current mechanism for HTTP Basic Authentication (BA) has the server challenge with a 401-response code and a realm identifier to which the client replies with an authorization header bearing the credentials, the present invention substitutes the static credentials with the always-changing TOTP token from the agreed-upon pseudo-random number generator algorithm seeded by the agreed-upon secret.

In an embodiment, the TOTP shared secret (e.g., the HOTP secret key) is given a label or name upon creation, equivalent to the realm designation in HTTP basic authentication (e.g., 401 Unauthorized 210 from FIG. 2 below). Additionally, an encoding mechanism (clear text, base64, CRC, SHA, etc.) is selected. In an embodiment, the client and the server both store these mappings in their secure storage/enclave to ensure privacy. In an embodiment, the encoding mechanism may be version controlled which enables upgrading to a more reliable and stable version of the algorithm in case of a breach.

In an embodiment, the version control of the algorithm also includes the date by when this version would be enforced, i.e., the component using the newer version would state a termination date, which is the last date on which the prior versions would be accepted. This ensures version compliance between components to use the most secure and stable version each time.

In an embodiment, at challenge time, the server will send a challenge response (e.g., 401 Unauthorized 610 from FIG. 6 below) with the corresponding WWW-Authenticate header bearing the name of the protocol in the present invention (e.g., TOTP in 401 Unauthorized 610 from FIG. 6 below), the version of the algorithm used, and the label or name (e.g., access to the microservices site in 401 Unauthorized 610 from FIG. 6 below) along with the server's own time in the date field.

In an embodiment, the server will send a hint value as part of the challenge response that the client may use to select a matching seed from among several seeds in its local data store to calculate the TOTP value of its response. In an embodiment, the hint value refers to a previous TOTP in force exactly one year prior to the current time specified in the date header in the challenge response.

In an embodiment, the client first checks if the server algorithm version matches its own. As the authentication process can only be successful if the version on both the client and the server match, the client takes required measures if it has a lower version. In an embodiment, if the client determines that the version of the algorithm it is running does not match the version that the server is running, the client may perform a remediation action. In an embodiment, the remediation action may include the client downloading and installing the version that matches the server. In an embodiment, the client then calculates the TOTP token using not its own time, but the time indicated by the server in the date header of the challenge response. In an embodiment, given the prevalent time synchrony, this would be identical at a sufficiently lax precision (e.g., within 30 seconds). In an embodiment, the calculated current TOTP is sent in the agreed encoding to the server via the authenticate header specifying the TOTP scheme.

In an embodiment, the server decodes the received TOTP token and checks it for a match using the values in the secure enclave for the named mapping. If equal, authentication is granted. If not equal, authentication is denied.

The following examples illustrate various use cases for the present invention.

In a first use case, a corporate site uses a two-tier Content Delivery Network (CDN) mechanism for managing traffic. In this use case, there is a dispatching CDN that receives the initial client request and any number of child CDNs to dispatch the request for fulfilment, based on business rules/logic. This hand-off is done over the open internet; therefore, the present invention would be applicable to continually authorize the dispatcher clients to the child CDN and avoid surreptitious/spurious use. In other words, without a valid TOTP token the child CDN would not be accessible to any client.

A related use case is securing communication between an event management system, a messaging platform, and/or a remote host when executing automation though bots. The present invention is used to validate and authenticate the origin to reduce the risk of Machine-in-the-Middle (MITM) attacks.

Another use case is for containerized application-deployment schemes of microservices applications that are susceptible to impersonation attacks due to their distributed nature and the fact that they are active for a short period of time and then go inactive. The present invention, by virtue of being standards-based, ensures that the microservices are used by duly authorized clients without the burden of creating a bespoke solution for each service.

In addition, containerized application-deployment schemes of microservices applications, unlike client-based sessions, are unable to store conventional session cookies. The present invention eliminates the need for locally stored cookies since the client does not have to maintain a logon session.

Finally, locally stored session cookies have the potential to be compromised or intercepted for malicious intent. The present invention eliminates the need for locally stored cookies.

FIG. 1 is a functional block diagram illustrating a distributed data processing environment, generally designated 100, suitable for operation of TOTP authentication program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and computing device 130, both connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110, computing device 130, and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes TOTP authentication program 112. In an embodiment, TOTP authentication program 112 is a program, application, or subprogram of a larger program for unattended authentication in HTTP using time-based one-time passwords. In an alternative embodiment, TOTP authentication program 112 may be located on any other device accessible by computing device 110 via network 120.

In an embodiment, computing device 110 includes information repository 114. In an embodiment, information repository 114 may be managed by TOTP authentication program 112. In an alternate embodiment, information repository 114 may be managed by the operating system of the device, alone, or together with, TOTP authentication program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, network data, authentication data, datastore data, security data, server data, client data, time data, and other data that is received by TOTP authentication program 112 from one or more sources, and data that is created by TOTP authentication program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Distributed data processing environment 100 includes computing device 130. Computing device 130 can be a standalone computing device, a management server, a web server, a mobile computing device, or any other electronic device or computing system capable of receiving, sending, and processing data. In an embodiment, computing device 130 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 130 can represent a server computing system utilizing multiple computers as a server system, such as in a cloud computing environment. In yet another embodiment, computing device 130 represents a computing system utilizing clustered computers and components (e.g., database server computers, application server computers, etc.) that act as a single pool of seamless resources when accessed within distributed data processing environment 100.

Figure 2:
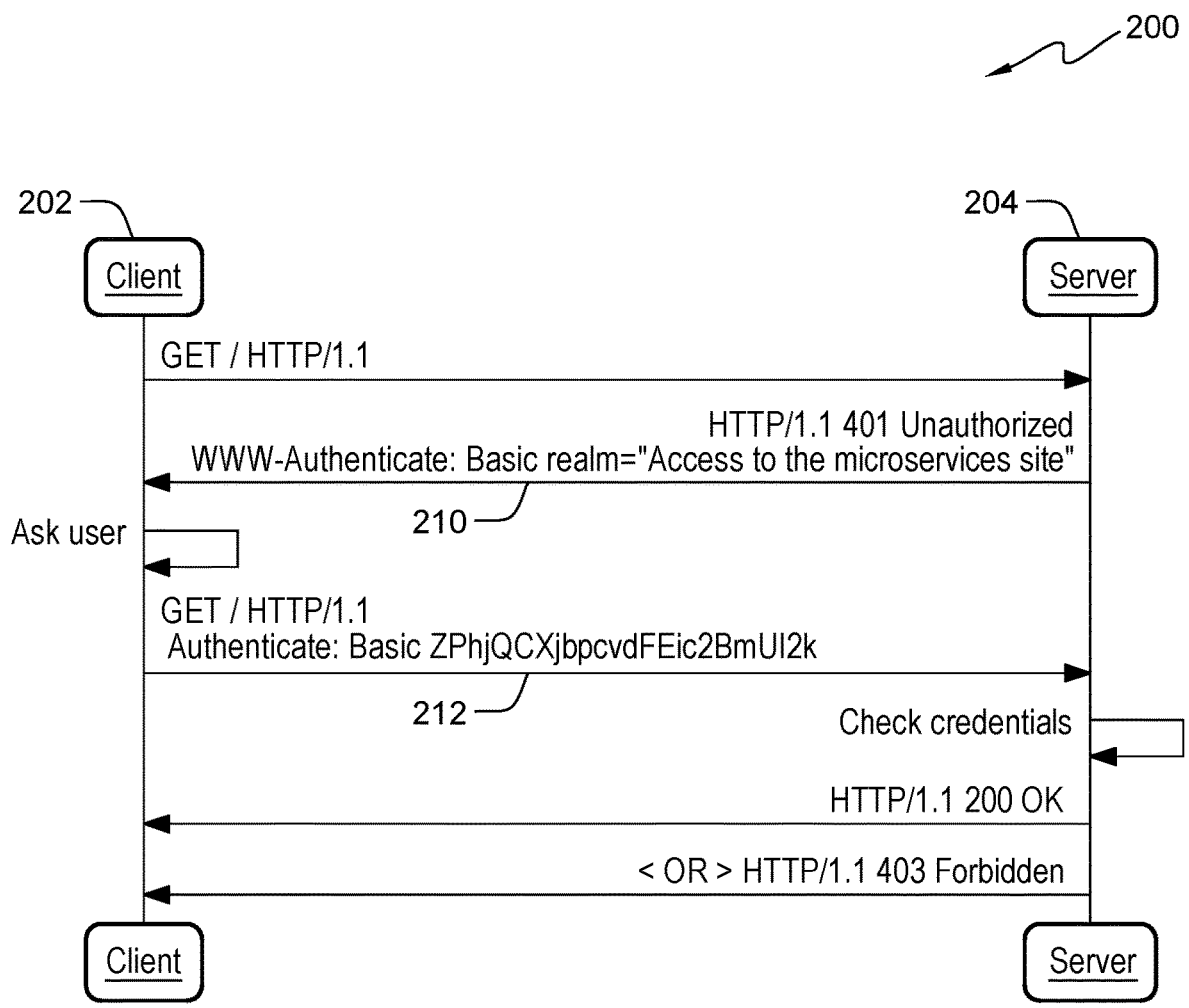
FIG. 2 is a sequence diagram that illustrates an example of an HTTP basic authentication transaction flow.

FIG. 2 is a sequence diagram, generally designated 200, that illustrates an example of an HTTP basic authentication transaction flow. The example of FIG. 2 is included to illustrate the basic HTTP authentication flow that may be used by the invention to incorporate authentication in HTTP using time-based one-time passwords.

In the example of FIG. 2, Client 202 requests access to Server 204 via HTTP. Server 204 responds to client 202 with 401 Unauthorized 210 which provides information on how to authorize with a WWW-Authenticate response header containing at least one challenge. The HTTP WWW-Authenticate response header defines the authentication method that should be used to gain access to a resource. In this example, 401 Unauthorized 210 specifies that the authentication method is Basic with a realm (a description of the protected area) of "Access to the microservices site." Typically, a client will present a password prompt to the user and will then issue the request including the correct authorization header. In this example, client 202 sends Authorization Request 212 containing the credentials to authenticate the user agent the server.

Figure 3:
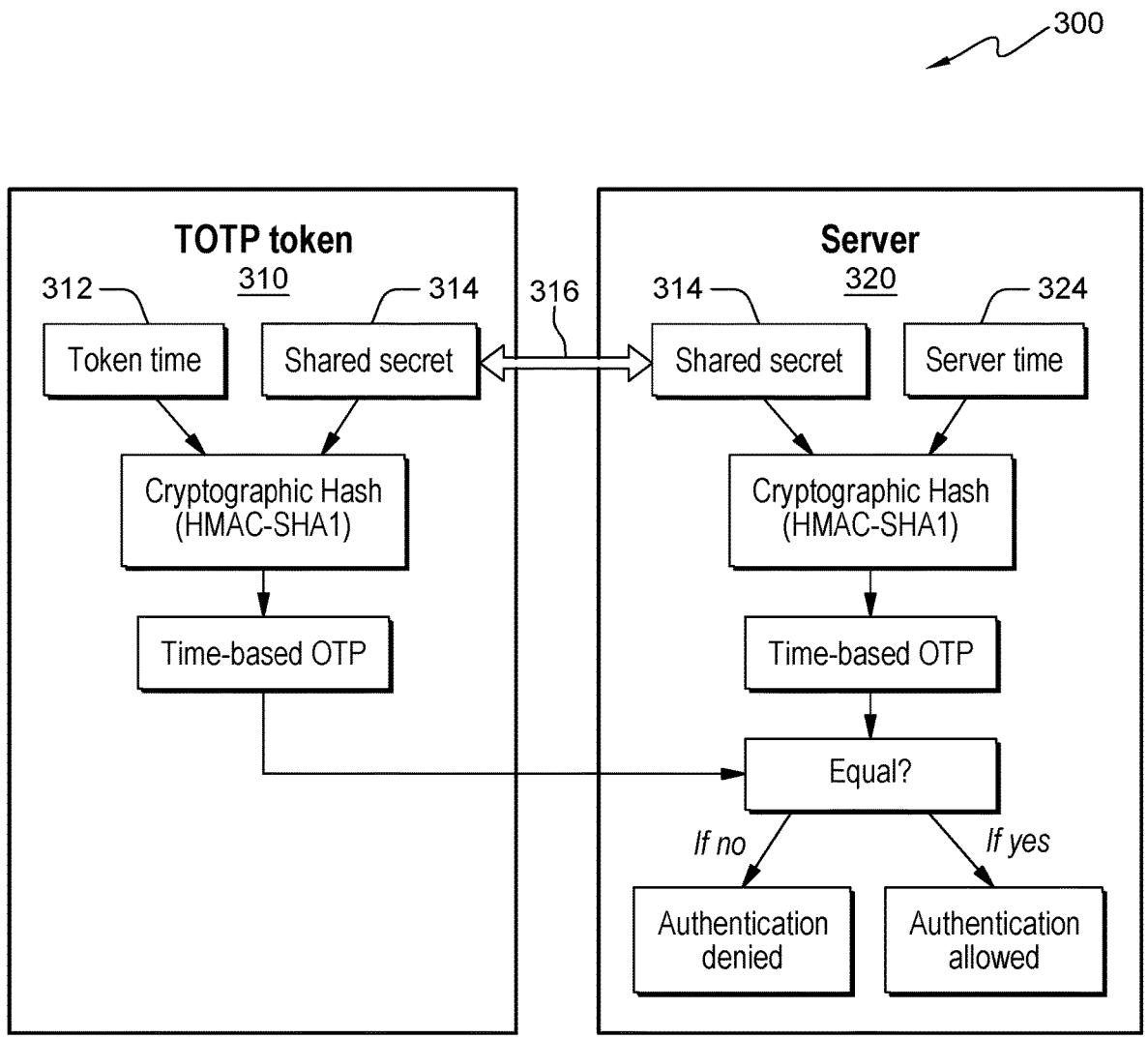
FIG. 3 is a high-level block diagram that illustrates an example of a TOTP authorization flow.

FIG. 3 is a high-level block diagram, generally designated 300, that illustrates an example of a TOTP authorization flow. The example illustrated by FIG. 3 demonstrates a standard method of authentication that may be used by the present invention to insert unattended authentication in HTTP using time-based one-time passwords into the standard authentication method.

FIG. 3 includes TOTP Token 310 generated by the client and the flow on Server 320 to generate and validate the TOTP token. In this flow, Token Time 312, the time on the client used to generate the TOTP token, and Server Time 324, used by the server to generate the TOTP token, must be the same time. Shared Secret 314 is used by both TOTP token 310 and server 320 to generate the cryptographic hash of the time to generate the TOTP token, which is illustrated by connection 316. While HMAC-SHA 1 is shown in the example of FIG. 3, any other appropriate cryptographic hash may be used as would be known to a person of skill in the art. Once both the client and the server have generated the TOTP tokens, the server tests the token to determine if they match. Authentication is allowed if the tokens match, and authentication is denied if the tokens to not match.

Figure 4:
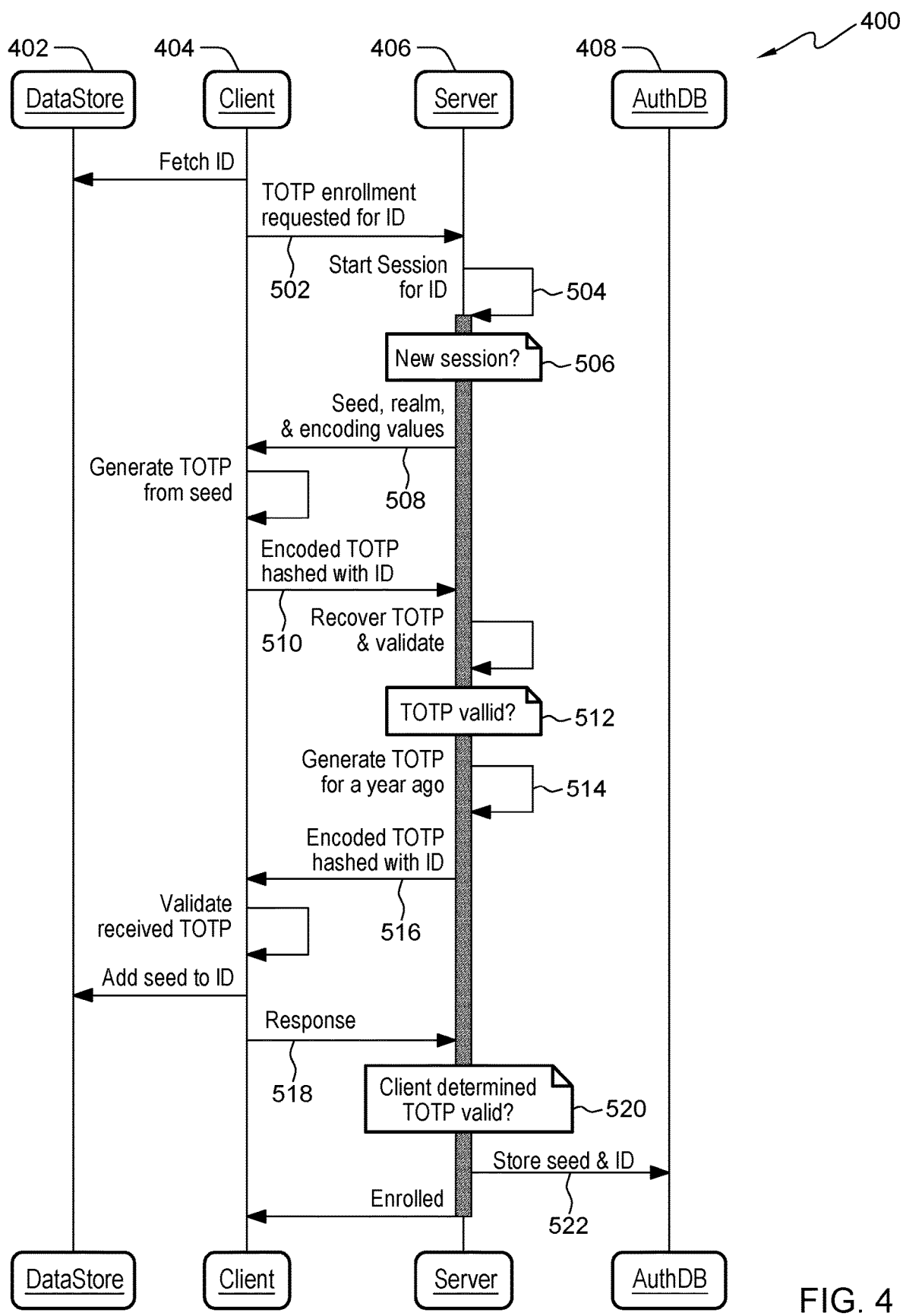
FIG. 4 is a sequence diagram, representing an example of a Unified Modeling Language (UML) Sequence for enrollment of a new client ID to an authorized client database on a server, in accordance with an embodiment of the present invention.

FIG. 4 is a sequence diagram, generally designated 400, representing an example of a Unified Modeling Language (UML) Sequence for enrollment of a new client ID to an authorized client database on a server. The example illustrated by FIG. 4 demonstrates a method to insert unattended authentication in HTTP using time-based one-time passwords into the standard authentication method of FIG. 3 above. The example of FIG. 4 illustrates one possible embodiment of connection 316 from FIG. 3 above.

Sequence diagram 400 includes client 404, the client requesting access to the HTTP realm, and server 406, the server that hosts the requested realm. Client 404 has local storage for the authentication seeds in DataStore 402, and server 406 has an authentication database, AuthDB 408.

The reference designators 502 through 522 represent the steps in the flow diagram of FIG. 5 and are explained below.

Figure 5:
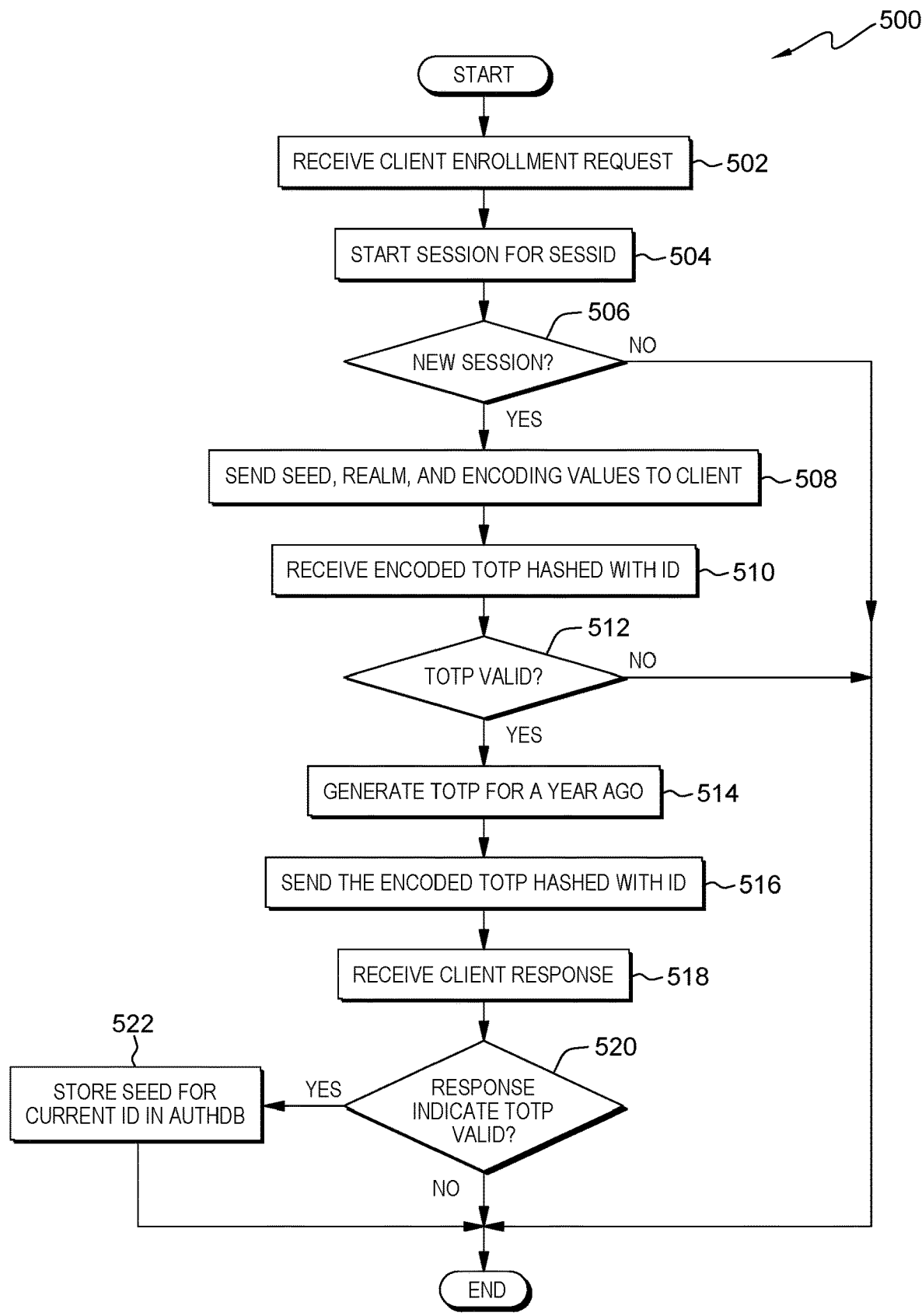
FIG. 5 is a flowchart depicting operational steps of the TOTP authentication program, on a computing device within the distributed data processing environment of FIG. 1, for HTTP authenticated enrollment using TOTP, in accordance with an embodiment of the present invention.

FIG. 5 represents the steps performed by the TOTP authentication program 112 for HTTP authenticated enrollment using TOTP, in accordance with an embodiment of the present invention. In an alternative embodiment, the steps of workflow 500 may be performed by any other program while working with TOTP authentication program 112. It should be appreciated that embodiments of the present invention provide at least for unattended authentication in HTTP using time-based one-time passwords. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 5 illustrates one possible iteration of the operational steps performed by TOTP authentication program 112 for HTTP authenticated enrollment using TOTP, which repeats each time a client requests enrollment in the network.

In an embodiment, TOTP authentication program 112 receives a request to enroll in the network and an identification (ID) from a client. In an embodiment, TOTP authentication program 112 starts a session and assigns a session identification (SessID) to the session. In an embodiment, TOTP authentication program 112 determines that the session is a new session based on the SessID. In an embodiment, TOTP authentication program 112 chooses a seed and performs a hash of the seed with the ID received from the client. In an embodiment, TOTP authentication program 112 receives the hash of the TOTP plus the client ID from the client along with the SessID. In an embodiment, TOTP authentication program 112 determines if the TOTP recovered from the hash received from the client is valid. In an embodiment, TOTP authentication program 112 sends a hint value as part of the challenge response that the client may use to select a matching seed from among several seeds in its local data store to calculate the TOTP value of its response. In an embodiment, TOTP authentication program 112 sends the hint value, i.e., the TOTP in force exactly one year prior to the current time specified in the date header from the response to the 401 challenge, to the client for verification. In an embodiment, the client determines if the TOTP is valid. In an embodiment, once the client has determined if the TOTP sent by TOTP authentication program 112 is valid, TOTP authentication program 112 receives a response from the client. In an embodiment, TOTP authentication program 112 determines if the response received from the client indicates that the TOTP is valid. In an embodiment, if TOTP authentication program 112 determines that the response received from the client indicates that the TOTP is valid, then TOTP authentication program 112 stores the seed for the current ID in an authorization database, e.g., AuthDB.

TOTP authentication program 112 receives a client enrollment request (step 502). In an embodiment, TOTP authentication program 112 receives a request from a client to enroll in the network and an identification (client ID) from a client.

TOTP authentication program 112 starts a session with a session identification of SessID (step 504). In an embodiment, TOTP authentication program 112 starts a session and assigns a session identification (SessID) to the session.

TOTP authentication program 112 determines if this is a new session (decision block 506). In an embodiment, TOTP authentication program 112 determines whether the session is a new session. In an embodiment, if TOTP authentication program 112 determines that the session is a new session ("yes" branch, decision block 506), then TOTP authentication program 112 proceeds to step 508 to choose a seed. In an embodiment, if TOTP authentication program 112 determines that the session is not a new session ("no" branch, decision block 506), then then there is no need to authenticate the session, so TOTP authentication program 112 ends for this cycle.

TOTP authentication program 112 sends the seed, realm, and encoding values to the client (step 508). In an embodiment, TOTP authentication program 112 chooses a seed and performs a hash of the seed with the ID received from the client in step 502. In an embodiment, TOTP authentication program 112 chooses the values arbitrarily, the less predictive the choice made by TOTP authentication program 112 the more entropy exists and the higher strength of the resulting scheme. Obfuscation in this step is highly desirable.

In an embodiment, TOTP authentication program 112 sends the hash of the seed with the client ID to the client, along with the realm identifier and encoding values, e.g., clear text, base64, CRC, SHA, etc. Upon receiving the hash from TOTP authentication program 112, the client recovers the seed from the hash and the current time from the date header. The client then generates the TOTP from the current time and performs a hash of the TOTP plus the client ID.

TOTP authentication program 112 receives the encoded TOTP hashed with the ID (step 510). In an embodiment, TOTP authentication program 112 receives the hash of the TOTP plus the client ID from the client along with the SessID. In an embodiment, TOTP authentication program 112 recovers the TOTP from the hash received from the client.

TOTP authentication program 112 determines if the TOTP is valid (decision block 512). In an embodiment, TOTP authentication program 112 determines if the TOTP recovered from the hash received from the client in step 510 is valid. In an embodiment, if the received TOTP value is valid, TOTP authentication program 112 knows that the client has received the secret and correctly implements the TOTP specification per the present invention (entangling ID and TOTP via hash function). In an embodiment, TOTP authentication program 112 determines whether the TOTP recovered from the hash received from the client in step 510 is valid by comparing the received TOTP to the hashed TOTP sent to the client by TOTP authentication program 112 in step 508.

In an embodiment, if TOTP authentication program 112 determines that the TOTP recovered from the hash received from the client in step 508 is valid ("yes" branch, decision block 512), then TOTP authentication program 112 proceeds to step 514 to generate a TOTP for a prior year. In an embodiment, if TOTP authentication program 112 determines that the TOTP recovered from the hash received from the client in step 510 is not valid ("no" branch, decision block 512), then the authentication has failed, and therefore TOTP authentication program 112 ends for this cycle.

TOTP authentication program 112 generates a TOTP for year ago (step 514). In an embodiment, TOTP authentication program 112 sends a hint value as part of the challenge response that the client may use to select a matching seed from among several seeds in its local data store to calculate the TOTP value of its response. In an embodiment, the hint value refers to the TOTP in force exactly one year prior to the current time specified in the date header from the response to the 401 challenge. In another embodiment, TOTP authentication program 112 may use any other appropriate hint value.

In an embodiment, the time exactly one year ago is an arbitrary time that is chosen in the method to create a fixed reference point for validating that the scheme is correctly understood and implemented by both parties. In an embodiment, it is essentially a test. In an embodiment, the actual value "a year ago" is arbitrarily chosen for the present invention. In other embodiments, the fixed reference point for validating that the scheme is correctly understood and implemented by both parties may be "two years ago", "one year in the future", any other relative value that is a fixed distance from the present, or it may be an absolute value. The choice of a relative reference time a known distance from the present yields a stronger (cryptographically speaking) system and is thus preferred. In an embodiment, the choice may be included in the versioning scheme in the enrollment process, where version 1.0 is exemplar one year ago, version 1.1 is exemplar two years ago, etc. In an embodiment, however, the client and server cannot pick a time, as it must be picked for them so they can indicate complete understanding of and practice in the scheme.

TOTP authentication program 112 sends the encoded TOTP hashed with ID (step 516). In an embodiment, TOTP authentication program 112 sends the hint value, e.g., the TOTP in force exactly one year prior to the current time specified in the date header from the response to the 401 challenge, to the client for verification. In an embodiment, the client determines if the TOTP is valid.

In an embodiment, validation indicates to the client that the server is fully complicit with the present invention (generating a TOTP at an arbitrary time for the given seed and entangling it with the client-chosen ID) such that it can be a full partner is the shared secret in the future. In an embodiment, the client indicates this understanding by responding to TOTP authentication program 112 on the server.

TOTP authentication program 112 receives a response from the client (step 518). In an embodiment, once the client has determined if the TOTP sent by TOTP authentication program 112 is valid, TOTP authentication program 112 receives a response from the client.

TOTP authentication program 112 determines if the response received from the client indicates that the TOTP is valid (decision block 520). In an embodiment, if TOTP authentication program 112 determines that the response received from the client indicates that the TOTP is valid ("yes" branch, decision block 520), then TOTP authentication program 112 proceeds to step 522 to store the seed. In an embodiment, if TOTP authentication program 112 determines that the response received from the client indicates that the TOTP is not valid ("no" branch, decision block 520), then the authentication has failed, and therefore TOTP authentication program 112 ends for this cycle.

TOTP authentication program 112 stores the seed for the current ID in an authorization database (step 522). In an embodiment, if TOTP authentication program 112 determines that the response received from the client indicates that the TOTP is valid, then the client is successfully enrolled in the client database, and TOTP authentication program 112 stores the seed for the current ID in an authorization database, e.g., AuthDB. In an embodiment, since the client has determined that the authentication was successful, the client stores the seed for the realm locally.

Figure 6:
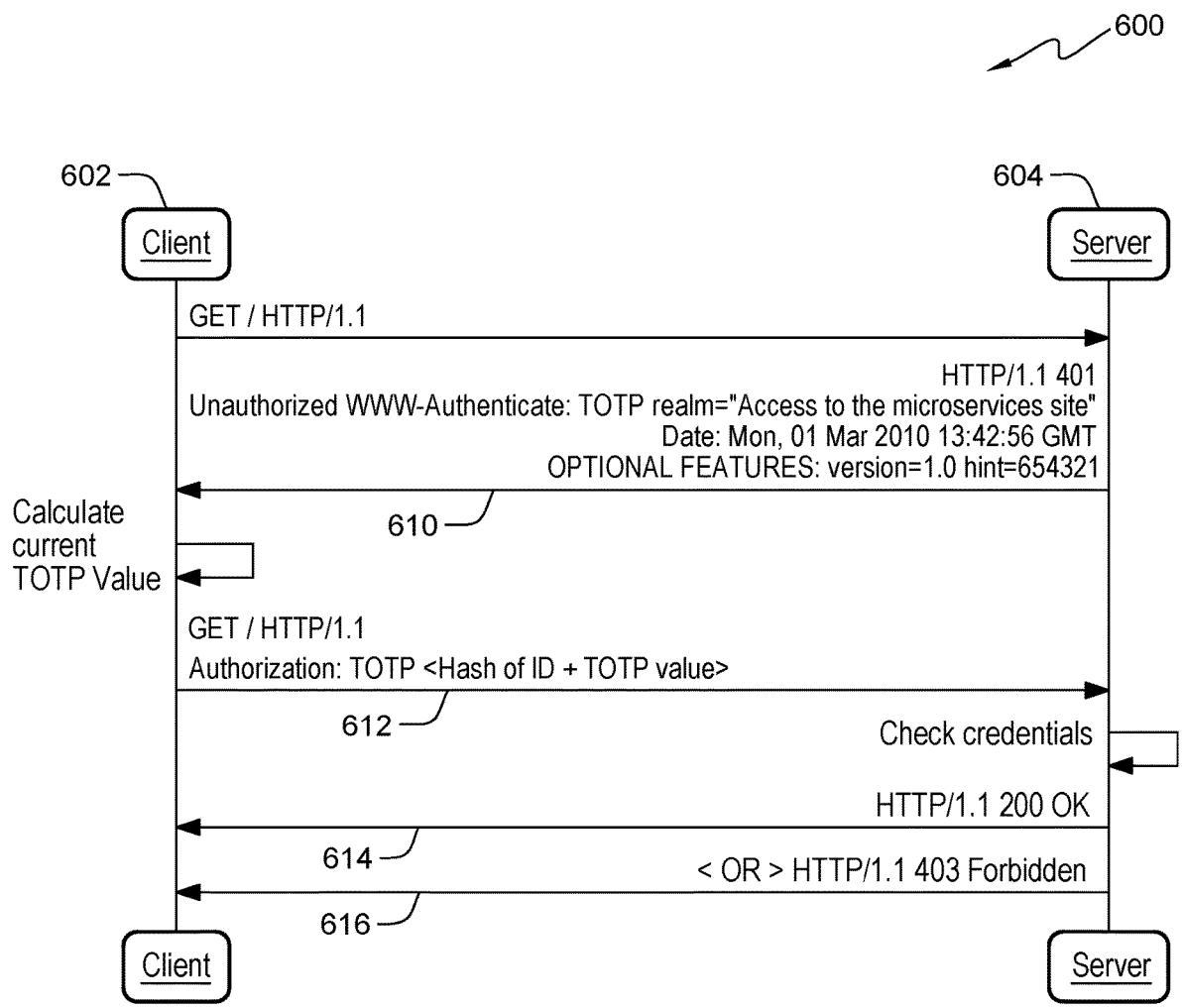
FIG. 6 is a sequence diagram that illustrates an example of an HTTP authentication transaction flow using TOTP for authentication, in accordance with an embodiment of the present invention.

FIG. 6 is a sequence diagram, generally designated 600, that illustrates an example of an HTTP authentication transaction flow using TOTP for authentication, in accordance with an embodiment of the present invention. FIG. 6 illustrates the same basic authentication flow as FIG. 2 above, but here the "Basic" authentication has been replaced by the TOTP authentication of the present invention.

In the example of FIG. 6, as in the example of FIG. 2, Client 602 requests access to Server 604 via HTTP. Server 604 responds to client 602 with 401 Unauthorized 610 which provides information on how to authorize with a WWW-Authenticate response header containing at least one challenge. The HTTP WWW-Authenticate response header defines the authentication method that should be used to gain access to a resource. In this example, 401 Unauthorized 610 specifies that the authentication method is "TOTP" with a realm of "Access to the microservices site." Unlike in FIG. 2 however, using the present invention server 604 sends the current date, e.g., Mon, 1 Mar. 2010 13:42:56 GMT in this example, which is used to generate the TOTP token. Client 602 calculates the current TOTP value, and a hash of the TOTP value along with the identification of the client. Server 604 receives this hash from client 602 in Response 612 and validates the TOTP. If the received hashed TOTP matches the TOTP value sent by server 604, then server 604 grants the authentication, and sends HTTP 200 OK message 614 to client 602. If the received hashed TOTP does not match the TOTP value sent by server 604, then server 604 denies the authentication, and sends HTTP 403 Forbidden message 616 to client 602.

In an alternate embodiment, server 604 may send optional features in 401 Unauthorized 610 in addition to the WWW-Authenticate response header. In an embodiment, these optional features may include a version, e.g., version=1.0, and/or a hint, e.g., hint=654321.

In an embodiment where the optional features include a version, the client determines if the version of the algorithm on the server matches its own. Since the authentication process can only be successful if the version of the algorithms on both the client and the server match, the client takes required measures if it has a mismatched version. In an embodiment, if the version of the algorithm on the client is prior to the version of the algorithm on the server, the client may retrieve and install the matching version. In another embodiment, if the version of the algorithm on the client does not match the version of the algorithm on the server, the client may take any other appropriate action as would be known to a person of skill in the art.

FIG. 6 illustrates the verification and realization of the present invention into current standard technology, and is provided as validation of the invention to person of skill in the art. It should be appreciated that the flow of FIG. 6 cannot happen without the enrollment work done as part of FIG. 4 and FIG. 5 above, and specifically the mutual verification by the client and server that the other party has the correct seed values, an accurate clock, and correctly implements the scheme by the issuance of matching TOTP tokens at an arbitrary time not of their choosing.

Figure 7:
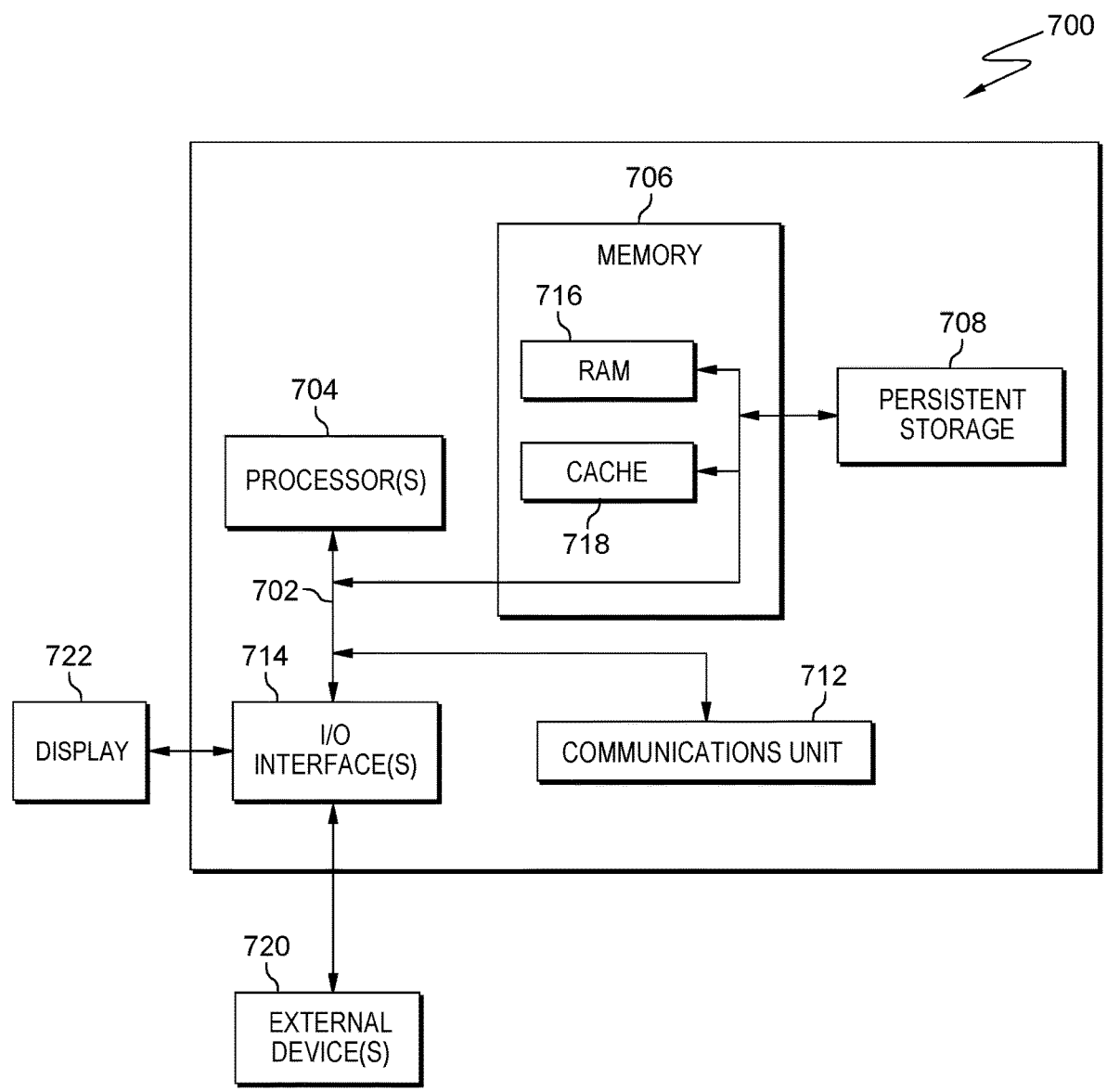
FIG. 7 depicts a block diagram of components of the computing devices executing the TOTP authentication program within the distributed data processing environment of FIG. 1, in accordance with an embodiment of the present invention.

FIG. 7 is a block diagram depicting components of computing device 110 suitable for TOTP authentication program 112, in accordance with at least one embodiment of the invention. FIG. 7 displays computer 700; one or more processor(s) 704 (including one or more computer processors); communications fabric 702; memory 706, including random-access memory (RAM) 716 and cache 718; persistent storage 708; communications unit 712; I/O interfaces 714; display 722; and external devices 720. It should be appreciated that FIG. 7 provides only an illustration of one embodiment and does not imply any limitations with regard to the environments in which different embodiments may be implemented. Many modifications to the depicted environment may be made.

As depicted, computer 700 operates over communications fabric 702, which provides communications between computer processor(s) 704, memory 706, persistent storage 708, communications unit 712, and I/O interface(s) 714. Communications fabric 702 may be implemented with any architecture suitable for passing data or control information between processors 704 (e.g., microprocessors, communications processors, and network processors), memory 706, external devices 720, and any other hardware components within a system. For example, communications fabric 702 may be implemented with one or more buses.

Memory 706 and persistent storage 708 are computer readable storage media. In the depicted embodiment, memory 706 comprises RAM 716 and cache 718. In general, memory 706 can include any suitable volatile or non-volatile computer readable storage media. Cache 718 is a fast memory that enhances the performance of processor(s) 704 by holding recently accessed data, and near recently accessed data, from RAM 716.

Program instructions for TOTP authentication program 112 may be stored in persistent storage 708, or more generally, any computer readable storage media, for execution by one or more of the respective computer processors 704 via one or more memories of memory 706. Persistent storage 708 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links. In the context of some embodiments of the present invention, the source of the various input data may be physically remote to computer 700 such that the input data may be received, and the output similarly transmitted via communications unit 712.

I/O interface(s) 714 allows for input and output of data with other devices that may be connected to computer 700. For example, I/O interface(s) 714 may provide a connection to external device(s) 720 such as a keyboard, a keypad, a touch screen, a microphone, a digital camera, and/or some other suitable input device. External device(s) 720 can also include portable computer readable storage media such as, for example, thumb drives, portable optical or magnetic disks, and memory cards. Software and data used to practice embodiments of the present invention, e.g., TOTP authentication program 112, can be stored on such portable computer readable storage media and can be loaded onto persistent storage 708 via I/O interface(s) 714. I/O interface(s) 714 also connect to display 722.

Display 722 provides a mechanism to display data to a user and may be, for example, a computer monitor. Display 722 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving, by one or more computer processors, a request from a client for a Hypertext Transfer Protocol (HTTP) authentication on a server;
    sending, by the one or more computer processors, a challenge to the client, wherein the challenge includes a header that indicates that a Time-based One-time Password (TOTP) is to be used for the HTTP authentication;
    receiving, by the one or more computer processors, a first response from the client based on a first TOTP value and a shared secret, wherein the first response is encoded based on an encoding mechanism included in the header; and
    responsive to validating the first TOTP value and the shared secret from the client, authenticating, by the one or more computer processors, the client,
    wherein the shared secret is used to generate a cryptographic hash of the first TOTP value along with a client identification for validating the first TOTP value,
    responsive to validating the first TOTP value and the shared secreted from the client, authenticating the client comprises:
        responsive to validating the first TOTP value and the shared secret from the client, sending, by the one or more computer processors, a hint value to the client;
        receiving, by the one or more computer processors, a second response from the client, wherein the second response includes a second TOTP value based on the hint value, wherein the second response is encoded based on the encoding mechanism included in the header; and
        responsive to validating the second TOTP value, authenticating, by the one or more computer processors, the client, and
    the hint value is a previous TOTP in force exactly one year prior to a time specified in a date header in the challenge.

2. The computer-implemented method of claim 1, wherein sending
    the challenge to the client, wherein the challenge includes the header that indicates that the TOTP is to be used for the HTTP authentication comprises:
    sending, by the one or more computer processors, the challenge to the client, wherein the challenge includes the header that indicates that the TOTP is to be used for the HTTP authentication, and further wherein the challenge includes a first algorithm version in use on the server;
    receiving, by the one or more computer processors, a response from the client that includes a second algorithm version in use on the client; and
    responsive to determining that the first algorithm version does not match the second algorithm version, denying, by the one or more computer processors, the authentication to the client.

3. The computer-implemented method of claim 2, wherein responsive to determining that the first algorithm version does not match the second algorithm version, denying the authentication to the client comprises:
    responsive to determining that the first algorithm version does not match the second responsive to determining that the first algorithm version does not match the second algorithm version, determining, by the one or more computer processors, a termination date for the first algorithm version in use on the server, wherein the termination date for the first algorithm version is a last date on which prior versions of the second algorithm version are accepted; and responsive to determining that a current date is past the termination date, denying, by the one or more computer processors, the authentication to the client.

4. The computer-implemented method of claim 2, wherein receiving the response from the client includes the second algorithm version in use on the client comprises:

receiving, by the one or more computer processors, the response from the client that includes the second algorithm version in use on the client, wherein the response includes a remediation action performed by the client, and further wherein the remediation action performed by the client includes downloading and installing the first algorithm version on the client.

5. The computer-implemented method of claim 1, further comprising:

enrolling, by the one or more computer processors, the client into an authorized client database on the server, wherein enrolling the client uses a third TOTP value; and responsive to successfully enrolling the client into the authorized client database on the server, storing, by the one or more computer processors, the client identification and the shared secret in the authorized client database on the server.

6. A computer program product, the computer program product comprising one or more computer readable storage media and program instructions stored on the one or more computer readable storage media, the program instructions including instructions to:

receive a request from a client for a Hypertext Transfer Protocol (HTTP) authentication on a server;

send a challenge to the client, wherein the challenge includes a header that indicates that a Time-based One-time Password (TOTP) is to be used for the HTTP authentication;

receive a first response from the client based on a first TOTP value and a shared secret, wherein the first response is encoded based on an encoding mechanism included in the header; and responsive to validating the first TOTP value and the shared secret from the client, authenticate the client, wherein the shared secret is used to generate a cryptographic hash of the first TOTP value along with a client identification for validating the first TOTP value, the encoding mechanism is version controlled in order to allow for an upgrade to a reliable and stable version of an algorithm included in the challenge, responsive to validating the first TOTP value and the shared secret from the client, authenticate the client comprises one or more of the following program instructions, stored on the one or more computer readable storage media, to:

responsive to validating the first TOTP value and the shared secret from the client, send a hint value to the client;

receive a second response from the client, wherein the second response includes a second TOTP value based on the hint value, wherein the second response is encoded based on the encoding mechanism included in the header; and responsive to validating the second TOTP value, authenticate the client, and the hint value is a previous TOTP in force exactly one year prior to a time specified in a date header in the challenge.

7. The computer program product of claim 6, wherein send the challenge to the client, wherein the challenge includes the header that indicates that the TOTP is to be used for the HTTP authentication comprises one or more of the following program instructions, stored on the one or more computer readable storage media, to:

send the challenge to the client, wherein the challenge includes the header that indicates that the TOTP is to be used for the HTTP authentication, and further wherein the challenge includes a first algorithm version in use on the server;

receive a response from the client that includes a second algorithm version in use on the client; and responsive to determining that the first algorithm version does not match the second algorithm version, deny the authentication to the client.

8. The computer program product of claim 7, wherein responsive to determining that the first algorithm version does not match the second algorithm version, deny the authentication to the client comprises one or more of the following program instructions, stored on the one or more computer readable storage media, to:

responsive to determining that the first algorithm version does not match the second algorithm version, determine a termination date for the first algorithm version in use on the server, wherein the termination date for the first algorithm version is a last date on which prior versions of the second algorithm version are accepted; and responsive to determining that a current date is past the termination date, deny the authentication to the client.

9. The computer program product of claim 7, wherein receive the response from the client includes the second algorithm version in use on the client comprises one or more of the following program instructions, stored on the one or more computer readable storage media, to:

receive the response from the client that includes the second algorithm version in use on the client, wherein the response includes a remediation action performed by the client, and further wherein the remediation action performed by the client includes downloading and installing the first algorithm version on the client.

10. The computer program product of claim 6, further comprising one or more of the following program instructions, stored on the one or more computer readable storage media, to:

enroll the client into an authorized client database on the server, wherein enrolling the client uses a third TOTP value; and responsive to successfully enrolling the client into the authorized client database on the server, store the client identification and the shared secret in the authorized client database on the server.

11. A computer system comprising:
one or more computer processors:
one or more computer readable storage media; and
program instructions stored on the one or more computer readable storage media for execution by at least one of the one or more computer processors, the stored program instructions including instructions to:

receive a request from a client for a Hypertext Transfer Protocol (HTTP) authentication on a server;
send a challenge to the client, wherein the challenge includes a header that indicates that a Time-based One-time Password (TOTP) is to be used for the HTTP authentication;
receive a first response from the client based on a first TOTP value and a shared secret, wherein the first response is encoded based on an encoding mechanism included in the header; and
responsive to validating the first TOTP value and the shared secret from the client, authenticate the client,
wherein the shared secret is used to generate a cryptographic hash of the first TOTP value along with a client identification for validating the first TOTP value,
the header comprises an authentication method used to gain access to a resource,
responsive to validating the first TOTP value and the shared secret from the client, authenticate the client comprises one or more of the following program instructions, stored on the one or more computer readable storage media, to:
responsive to validating the first TOTP value and the shared secret from the responsive to validating the first TOTP value and the shared secret from the client, send a hint value to the client;
receive a second response from the client, wherein the second response includes a second TOTP value based on the hint value, wherein the second response is encoded based on the encoding mechanism included in the header; and
responsive to validating the second TOTP value, authenticate the client, and
the hint value is a previous TOTP in force exactly one year prior to a time specified in a date header in the challenge.

12. The computer system of claim 11, wherein send the challenge to the client, wherein the challenge includes the header that indicates that the TOTP is to be used for the HTTP authentication comprises one or more of the following program instructions, stored on the one or more computer readable storage media, to:

send the challenge to the client, wherein the challenge includes the header that indicates that the TOTP is to be used for the HTTP authentication, and further wherein the challenge includes a first algorithm version in use on the server;
receive a response from the client that includes a second algorithm version in use on the client; and
responsive to determining that the first algorithm version does not match the second algorithm version, deny the authentication to the client.

13. The computer system of claim 12, wherein responsive to determining that the first algorithm version does not match the second algorithm version, deny the authentication to the client comprises one or more of the following program instructions, stored on the one or more computer readable storage media, to:
responsive to determining that the first algorithm version does not match the second responsive to determining that the first algorithm version does not match the second algorithm version, determine a termination date for the first algorithm version in use on the server, wherein the termination date for the first algorithm version is a last date on which prior versions of the second algorithm version are accepted; and
responsive to determining that a current date is past the termination date, deny the authentication to the client.

14. The computer system of claim 12, wherein receive the response from the client that includes the second algorithm version in use on the client comprises one or more of the following program instructions, stored on the one or more computer readable storage media, to:
receive the response from the client that includes the second algorithm version in use on receive the response from the client that includes the second algorithm version in use on the client, wherein the response includes a remediation action performed by the client, and further wherein the remediation action performed by the client includes downloading and installing the first algorithm version on the client.

* * * * *